(12) United States Patent
Zulpa et al.

(10) Patent No.: US 7,742,956 B2
(45) Date of Patent: *Jun. 22, 2010

(54) METHOD FOR FACILITATING AND MAINTAINING AN ACTIVE PARTS DATA REPOSITORY

(75) Inventors: Paul A. Zulpa, Woodbury, CT (US); Charles Patrick Clarke, Hopewell Junction, NY (US); Thomas E. Donovan, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 12/044,236

(22) Filed: Mar. 7, 2008

(65) Prior Publication Data

US 2008/0154681 A1 Jun. 26, 2008

Related U.S. Application Data

(62) Division of application No. 09/882,094, filed on Jun. 15, 2001, now Pat. No. 7,376,602.

(51) Int. Cl.
*G06F 17/50* (2006.01)
*G06Q 20/00* (2006.01)
*G06F 17/00* (2006.01)

(52) U.S. Cl. .............................. 705/29; 705/28; 705/22; 707/200; 707/104.1

(58) Field of Classification Search ..................... 705/28
See application file for complete search history.

(56) References Cited

U.S. PATENT DOCUMENTS

| 5,216,612 A * | 6/1993 | Cornett et al. ................. 700/96 |
| 5,765,143 A * | 6/1998 | Sheldon et al. ................ 705/28 |
| 5,777,877 A * | 7/1998 | Beppu et al. ................... 700/97 |
| 5,960,414 A | 9/1999 | Rand et al. |
| 5,963,919 A * | 10/1999 | Brinkley et al. ............... 705/28 |
| 6,078,891 A | 6/2000 | Riordan et al. |
| 6,119,100 A | 9/2000 | Walker et al. |
| 6,128,626 A * | 10/2000 | Beauchesne .............. 707/104.1 |
| 6,151,582 A | 11/2000 | Huang et al. |
| 6,167,406 A | 12/2000 | Hoskins et al. |
| 6,581,798 B2 | 6/2003 | Liff et al. |
| 6,633,878 B1 | 10/2003 | Underwood |
| 6,735,604 B2 | 5/2004 | Miller et al. |
| 2002/0143665 A1 * | 10/2002 | Santos et al. ................... 705/28 |

\* cited by examiner

*Primary Examiner*—Ramsey Refai
(74) *Attorney, Agent, or Firm*—Cantor Colburn LLP; Derek Jennings

(57) ABSTRACT

A storage medium encoded with machine-readable computer program code for facilitating database management processes for an enterprise is provided. The storage medium includes instructions for causing a computer to implement a method. The method includes extracting part data relating to a part from a data storage device, retrieving activity data related to the part, which includes demand data, purchase data, and creation data. The method further includes evaluating the part data and the activity data, associating a status code with the part data based upon results of the evaluation, and storing the part data and the status code in the data storage device. The database management processes are accomplished by a parts database management software application.

6 Claims, 2 Drawing Sheets

METHOD FOR FACILITATING AND MAINTAINING AN ACTIVE PARTS DATA REPOSITORY

CROSS REFERENCE TO RELATED APPLICATIONS

This application is a divisional of U.S. Ser. No. 09/882,094, filed Jun. 15, 2001, the contents of which is incorporated by reference herein in its entirety.

BACKGROUND

This invention relates generally to database management processes, and more particularly, the present invention relates to a method for determining active part numbers and maintaining a current data repository for active part numbers in a manufacturing environment.

The technology of e-commerce and the expanding global marketplace has placed new challenges on the electronics industry. With traditional geographic barriers relating to trade breaking down, manufacturers are now being faced with a barrage of business choices and purchasing options, ranging from selecting office suppliers to Internet service and applications providers. Many manufacturing enterprises are talking advantage of this global marketplace and measurably cutting costs by outsourcing their production processes to other manufacturers. By cutting costs, these businesses are able to become more competitive, selling finished products at lower prices.

Although e-commerce has offered many commercial advantages, its rapid and steady growth has created some difficulties for the manufacturing industry. For example, older proprietary and legacy computer systems were not equipped to transition well into the new age of Internet technology. These systems typically operated incompatible software and employed disparate hardware devices which were unable to communicate with one another. Costly upgrades and extensive customization were necessary before these older systems could be leveraged into the new economy. To add to the frustration, global manufacturers with multiple geographically dispersed manufacturing sites and disparate manufacturing systems created islands of automation among them. These decentralized business units operated independently of one another, often employing incompatible business schemes requiring substantial integration measures before the global enterprise could effectively operate as a single entity.

The supply chain management processes of the manufacturing industry were not immune from the challenges created by this globalized market. Manufacturers continue to struggle to ensure that their design, development, and procurement groups are in sync with respect to the demand, availability, and financial aspects of their core parts and components requirements. A typical manufacturing enterprise may store hundreds of thousands of parts in its databases. Some of them are actively used by the enterprise, while others may include older legacy parts, parts that have become obsolete, out of production, or are otherwise no longer used by the enterprise. Needless to say, the bulk of this 'inactive' information is not particularly useful to the enterprise, however, would require a tremendous amount of human capital to filter out the unwanted data from the desired data. Further, many fields of information relating to these parts data are time dependent in that their usefulness or value to the enterprise may change over time. This information would need to be continuously reviewed and updated as well. If no action were taken by the enterprise, on the other hand, this data would continue to accumulate in the system databases as new parts are entered and others become obsolete, resulting in clogged communications lines, slow searches, and almost certain retrieval of unwanted parts information. It is therefore desirable to identify active parts used by the enterprise so evaluation groups or councils for the enterprise can focus on the critical parts that require maintenance streamlining the database management processes related to parts data.

BRIEF SUMMARY

An exemplary embodiment relates to a storage medium encoded with machine-readable computer program code for facilitating database management processes for an enterprise. The storage medium includes instructions for causing a computer to implement a method. The method includes extracting part data relating to a part from a data storage device, retrieving activity data related to the part, which includes demand data, purchase data, and creation data. The method further includes evaluating the part data and the activity data, associating a status code with the part data based upon results of the evaluation, and storing the part data and the status code in the data storage device. The database management processes are accomplished by a parts database management software application.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
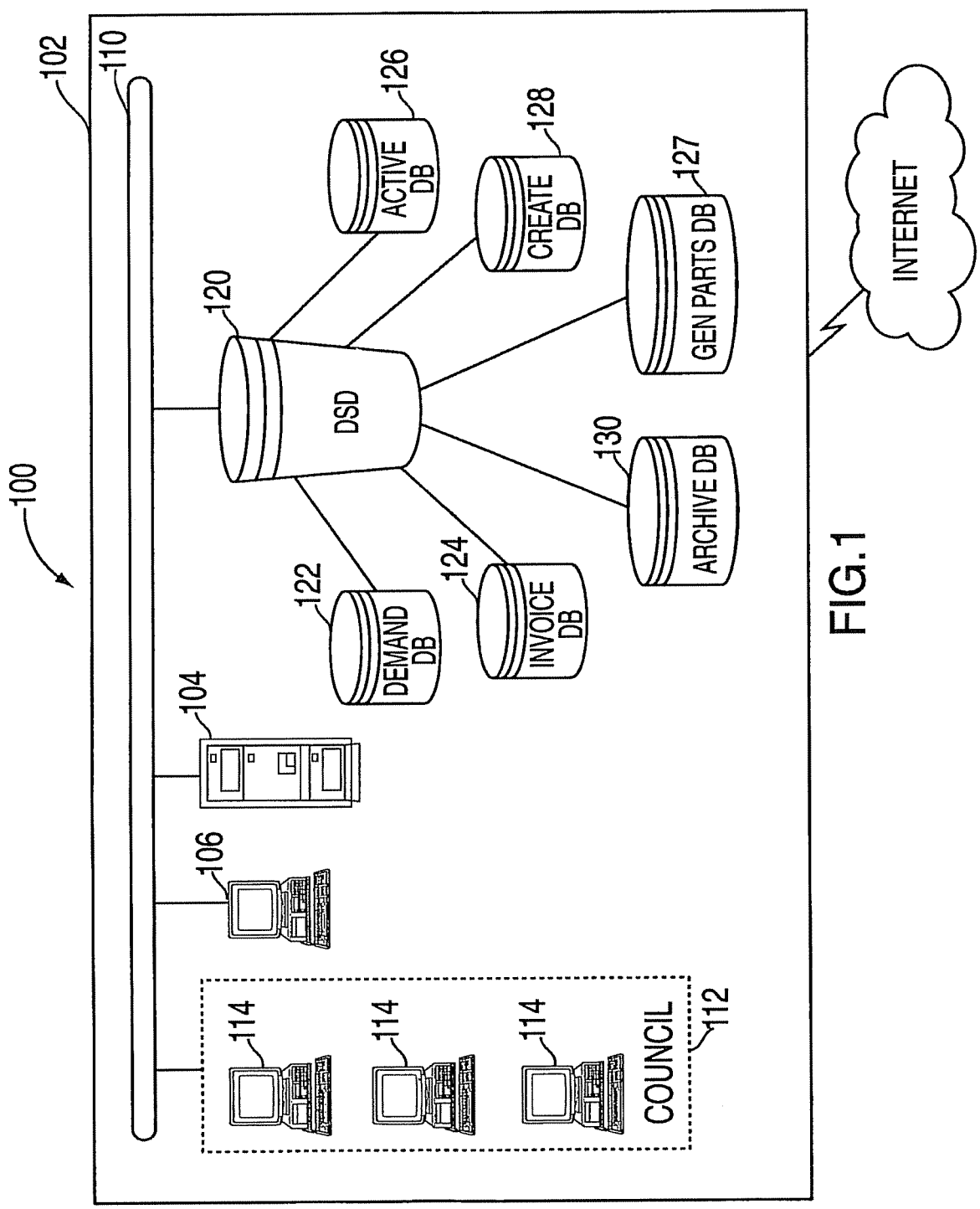
FIG. 1 is a block diagram of an exemplary network system upon which the parts database management process is implemented.

In an exemplary embodiment, the parts database management tool is implemented via a computer network environment such as that shown in FIG. 1. System 100 includes enterprise 102 which comprises client systems 114 representing a council for enterprise 102. Client systems 114 are in communication with one another as well as with other entities of enterprise 102 via network 110. Network 110 may be any suitable communications link known in the art such as a local or wide area network or internetwork. Enterprise 102 also includes client system 106 which is also connected to network 110 and represents a user or employee of enterprise 102. Server 104 implements the parts database management tool of the present invention as well as web server and applications software for allowing authorized entities or client systems 106 and 114 of enterprise 102 to communicate via network 110. Server 104 is also executing database management software for presenting queries and providing information retrieval services to entities of enterprise 102. For purposes of illustration, server 104 is executing Lotus Domino™ and Lotus Notes™ as its communications and groupware tools and is also executing IBM's DB2™ software for facilitating its database management processes. It should be noted that server 104 may share some or all of these applications with entities or client systems 106 and 114 of enterprise 102 in order to achieve the advantages of the present invention. Thus, although system 100 describes a "thin" client/server architecture model, those skilled in the art will appreciate that client systems 106 and 114 may alternatively execute many of the applications services otherwise provided by server 104.

Data storage device 120 may reside within enterprise 102 and houses databases 122, 124, 126, 127, 128, and 130, which are utilized by enterprise 102 and the parts database management tool. Demand database 122 stores part numbers which are designated as demand part numbers by enterprise 102. Demand part numbers are part numbers of a machine or product projected to be sold by an enterprise. A product is made up of many parts for which associated part numbers comprise a bill of material for that product. When a marketing group of an enterprise forecasts how many products will be sold, the product is exploited to determine how many of the individual part numbers that male up the product will be needed. The same applies to actual orders placed for a product. Forecasted requirements are combined with actual requirements to create a demand statement. Demand statements show what part numbers may be used in the near future (assuming the forecast is accurate). For example, a product is made up of five part numbers for which an associated quantity is determined.

| Part Number | Quantity |
| --- | --- |
| A | 1 |
| B | 10 |
| C | 5 |
| D | 6 |
| E | 7 |

Suppose marketing forecasts sales of 1,000 products per month starting in January for a nine month period. Actual orders have been placed for 500 products in April and May. Demand for each part number is as follows:

| MTH | FORECAST | ORDERS | TOTAL PRODUCT | A | B | C | D | E |
| --- | --- | --- | --- | --- | --- | --- | --- | --- |
| JAN | 1000 | 0 | 1000 | 1000 | 10000 | 5000 | 6000 | 7000 |
| FEB | 1000 | 0 | 1000 | 1000 | 10000 | 5000 | 6000 | 7000 |
| MAR | 1000 | 0 | 1000 | 1000 | 10000 | 5000 | 6000 | 7000 |
| APR | 1000 | 500 | 1500 | 1500 | 15000 | 7500 | 9000 | 10500 |
| MAY | 1000 | 500 | 1500 | 1500 | 15000 | 7500 | 9000 | 10500 |
| JUN | 1000 | 0 | 1000 | 1000 | 10000 | 5000 | 6000 | 7000 |
| JUL | 1000 | 0 | 1000 | 1000 | 10000 | 5000 | 6000 | 7000 |
| AUG | 1000 | 0 | 1000 | 1000 | 10000 | 5000 | 6000 | 7000 |
| SEP | 1000 | 0 | 1000 | 1000 | 10000 | 5000 | 6000 | 7000 |
| | TOTAL DEMAND | | | 10000 | 100000 | 50000 | 60000 | 70000 |

Invoice database 124 stores data pertaining to purchased parts. Create database 128 stores the date that a part number was added into the general parts database 127. General parts database 127 houses all part numbers and related data used or required by enterprise 102. Active database 126 stores only those part numbers and associated data related to active parts as determined by council 112 and the parts database management tool. Archive database 130 stores part numbers and related data associated with inactive parts that were filtered out through the execution of the parts database management tool via general parts database 127. These databases may alternatively be embodied in the form of a single database or may even be physically located externally to system 100 and retrievable by suitable networking solutions known in the art such as an Intranet or Extranet network as well as the Internet and wireless technologies.

The parts database management tool performs periodic extractions on data in general database 127, retrieves relevant associated data from demand database 122, invoice database 124, and create database 128, performs calculations on the cumulative data, filters out inactive parts for storage in archive database 130, and stores the resulting active parts data in active database 126 for subsequent review by council 112. Updating general parts database 127 in this manner enhances the parts data retrieval process, since the database is not overly burdened with inactive parts data. Users such as client system 106 and client systems of council 112 can access information in active database 126 more quickly and with substantial certainty that the information is current.

It should be noted that although the system databases described above for storing the active and inactive part numbers associated with the parts database management tool are represented as separate databases, these part numbers may alternatively reside on a single database with corresponding flags assigned for determining their status in order to achieve the advantages of the present invention. In this manner, a software front-end tool may be utilized as a filter to screen out inactive part numbers. Such filters are generally known and will be appreciated by those skilled in the art.

Figure 2:
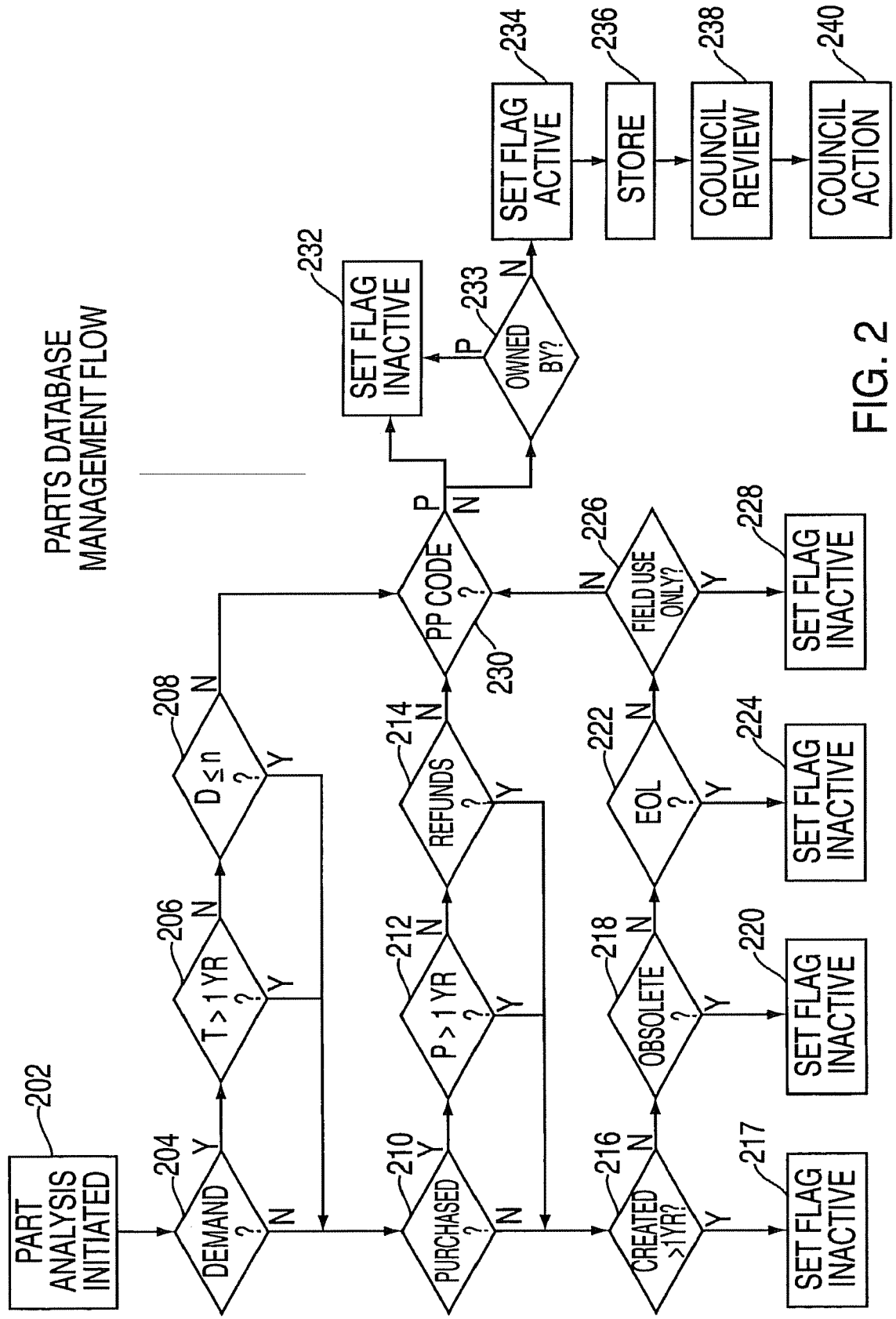
FIG. 2 is a flowchart illustrating how the parts database management tool is implemented.

The process of implementing the parts database management tool is further described in FIG. 2. Server 104 initiates a part analysis via the parts database management tool at step 202 whereby parts data related to one or more parts records is extracted from general parts database 127. Parts data may include information such as part number, part name, part description, as well as other desired information. The tool pulls related demand data from demand database 122 and assesses the demand status at step 204. If no demand is indicated, flow proceeds to step 210. If there is indicated a demand, the process continues to step 206 where the parts database management tool further examines the time status of the demand. If the demand activity is greater than one year, flow proceeds to step 210. If the demand activity is recent (i.e., less than or equal to one year), the quantity of the demand is then evaluated at step 208. If the quantity is less than or equal to 'n', 'n' being a variable number set by enterprise 102, then the parts database management tool proceeds to step 210. Thus, in steps 204-208 the parts database management tool assesses the demand activity related to the part whereby specified conditions that are met cause the tool designate the part to be 'inactive' unless further processing relating to purchase activity and/or other designated conditions dictate otherwise as will be described further herein. At step 210, the parts database management tool examines the purchase history of the part number(s) being examined and determines whether it has been purchased by the enterprise. This information may be found in the invoice database 124 in which invoice records of enterprise 102 indicate that it has paid for a purchase of that part. If no purchase activity has been found, the process continues at step 216. If purchase activity has occurred, the parts database management tool examines the time frame of the purchase activity at step 212. If the activity is greater than one year old, flow proceeds to step 216. If not, then the parts database management tool evaluates whether any refunds were given by enterprise 102 that would diminish the value of the purchase activity at step 214. If substantial refund activity occurred (threshold activity levels may be flexibly set by enterprise 102), flow proceeds to step 216, otherwise the process continues at step 230. At step 216, the parts database management tool examines the date in which the part was entered into general parts database 127. If the date entered is greater than one year, the parts database management tool sets a status flag at step 217. Otherwise, the parts database management tool examines the data to see if the part has become obsolete at step 218. If obsolete, the flag is set at step 220. If not, the parts database management tool checks to see if the part is end of life at step 222 and whether it has been designated 'field use only' at step 226. The term, 'field use' is used here to describe situations in which a product requires continued maintenance despite the fact that it may have gone end of life or out of production (e.g., product upgrade, warranty service obligations, etc.). If field maintenance is required, a service group for the enterprise may forecast field requirements or 'field use'. If any of these conditions are positive, an 'inactive' status flag is set by the tool at steps 217, 220, 224, and 228 respectively, otherwise, process continues at step 230 whereby a preferred parts code associated with the part data is examined by the tool. Additionally, if responses at steps 208 or 214 are negative, the process flow continues at step 230. Enterprise 102 may designate automatic inactive codes to parts which are required to be avoided. If the parts database management tool notes a positive response to the preferred part code query, then flow proceeds to step 232 where a status flag is set to inactive. If a negative response is received, flow proceeds to step 233 whereby the parts database management tool checks to see if a part number is owned by or reserved to certain divisions or groups of enterprise 102. The term, 'owned by' refers to certain groups within a manufacturing environment of enterprise 102 which put part numbers into a database for which no management of those part numbers are required. For example, a 'documents' group may have a part number for a type of paper used which is used internally for that group. The parts database management tool ensures that these part numbers are ignored during the process based upon ownership determinations. If no ownership or reservation issues arise, the parts database management tool sets the status flag to active at step 234, whereby the part number is transferred to active parts database 126 for storage at step 236. Subsequently, council 112 reviews these critical parts at step 238 and performs periodic evaluations and maintenance on this data at step 240.

The implementation of the parts database management tool enables an enterprise to significantly reduce the number of parts it needs to maintain by automating the critical parts evaluation processes and storing the filtered 'active' parts data in a centralized database for review and subsequent maintenance.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A storage medium encoded with machine-readable computer program code for facilitating database management processes for an enterprise via a communications network, the storage medium including instructions for causing a computer to implement a method, comprising:

extracting part data relating to a part from a data storage device;

retrieving activity data related to the part, the activity data including:

demand data;

purchase data; and creation data including a date a part number for the part is added to the data storage device;

evaluating the part data and the activity data;

associating a status code with the part data based upon results of the evaluating, the status code assigned being one of an active status and an inactive status; and storing the part data and the status code in the data storage device, wherein facilitating the database management processes is accomplished by a parts database management software application;

wherein evaluating the activity data includes:

determining an occurrence of a demand for the part;

assessing currency of the demand; and quantifying the demand;

wherein results of the determining the occurrence, the assessing the currency, and the quantifying the demand causes the parts database management software application to:

associate the status code with the part data when a first condition is met, the first condition relating to at least one of an absence or presence of the demand, the currency of the demand, and the quantity of the demand; and perform additional evaluations of the activity data when the first condition is not met.

2. The storage medium of claim 1, wherein the part data includes:

the part number;

a part name; and a part description.

3. The storage medium of claim 1, wherein the activity data includes forecast data related to the part number.

4. The storage medium of claim 1, wherein the activity data includes orders received related to the part number.

5. The storage medium of claim 1, wherein evaluating the activity data includes determining whether the part number is owned by a group of the enterprise, wherein the results of the determining causes the parts database management software application to associate the status code with the part data.

6. The storage medium of claim 1, wherein the results of the evaluating are reviewed by a council for the part numbers having the status code.

* * * * *